(12) United States Patent
Abdel-Kader

(10) Patent No.: US 8,195,249 B2
(45) Date of Patent: Jun. 5, 2012

(54) LOCATION BASED PATTERN FOR SCANNING FOR WIRELESS LOCAL AREA NETWORKS

(75) Inventor: Sherif Abdel-Kader, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 647 days.

(21) Appl. No.: 11/677,177

(22) Filed: Feb. 21, 2007

(65) Prior Publication Data

US 2008/0198820 A1 Aug. 21, 2008

(51) Int. Cl.
*H04B 1/38* (2006.01)
(52) U.S. Cl. ............... 455/574; 455/434; 455/432.1; 455/127.5; 455/456.1; 370/328
(58) Field of Classification Search .......... 370/338, 370/236.2, 328, 395.1, 396; 455/432.1, 343.1–343.6, 455/574, 127.5, 456.1, 414.2, 425, 441, 552.1, 455/553.1, 434
See application file for complete search history.

(56) References Cited

U.S. PATENT DOCUMENTS

| 6,954,649 B2 | 10/2005 | Kotzin |
| 2004/0120278 A1* | 6/2004 | Krantz et al. ............ 370/328 |
| 2004/0249915 A1* | 12/2004 | Russell .................... 709/223 |
| 2005/0192020 A1* | 9/2005 | Zhao et al. ............. 455/452.2 |
| 2006/0221901 A1 | 10/2006 | Yaqub et al. |
| 2006/0258371 A1* | 11/2006 | Krishnamurthi et al. .. 455/456.1 |
| 2007/0008941 A1* | 1/2007 | Narasimha et al. ........ 370/338 |
| 2008/0002605 A1 | 1/2008 | Todd et al. |

FOREIGN PATENT DOCUMENTS

| EP | 1610507 | 12/2005 |
| EP | 1732266 | 12/2006 |
| WO | 2007001689 | 1/2007 |
| WO | WO-2007/082368 | 7/2007 |

OTHER PUBLICATIONS

Matt, Stefan, Extended European Search Report for EP 07102844.3, Jun. 28, 2007.
U.S. Appl. No. 11/426,977, entitled "Power Saving in a Device Compatible with Cellular and WLAN networks", filed Jun. 28, 2006.
Ji, Liang, First Office Action for CA 2,622,522, Jun. 27, 2011.

\* cited by examiner

*Primary Examiner* — Marivelisse Santiago Cordero
*Assistant Examiner* — Dung Hong
(74) *Attorney, Agent, or Firm* — Integral Intellectual Property Inc.; Miriam Paton

(57) ABSTRACT

A mobile device having a wireless local area network interface and one or more other wireless interfaces identifies a location of the mobile device via one or more of the other wireless interfaces, estimates a likelihood of finding a wireless local area network at the location, and scans for wireless local area networks while at the location during scan sessions that are separated by intervals, where the intervals are determined by the estimated likelihood.

15 Claims, 11 Drawing Sheets

LOCATION BASED PATTERN FOR SCANNING FOR WIRELESS LOCAL AREA NETWORKS

BACKGROUND

Scanning is the process of identifying existing wireless local area networks (WLANs). A WLAN client device may implement a scanning pattern, which comprises scan sessions and intervals that separate these scan sessions. In between the scan sessions, the WLAN client device may conserve power by deactivating parts of its WLAN interface, for example a radio and/or a controller. The duration of the intervals between successive scan sessions is typically increased until it reaches an upper limit. The same scanning pattern is used by the WLAN client device regardless of its location or the number of WLAN networks nearby. For example, if the user of the WLAN client device happens to be in a small town, camping, hiking, or simply in a location where there are no WLAN networks, then scanning for WLANs is performed just as frequently as when the user happens to be in a location with plentiful WLAN coverage.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the embodiments of the invention.

A mobile device having a WLAN interface and one or more other wireless communication interfaces, may estimate a likelihood of finding any and/or any particular wireless local area network at any particular location from information collected by the mobile station via the WLAN interface and one or more of the other wireless interfaces. The mobile device may define a pattern for scanning for wireless local area networks at any particular location according to the estimated likelihood. The pattern comprises scan sessions during which the mobile device is to scan for one or more wireless local area networks, and intervals of time between the consecutive scan sessions. The mobile device may define patterns that differ from each other by at least the length of the intervals between the consecutive scan sessions. The mobile device may collect information about its WLAN activities while at a particular location.

Figure 1:
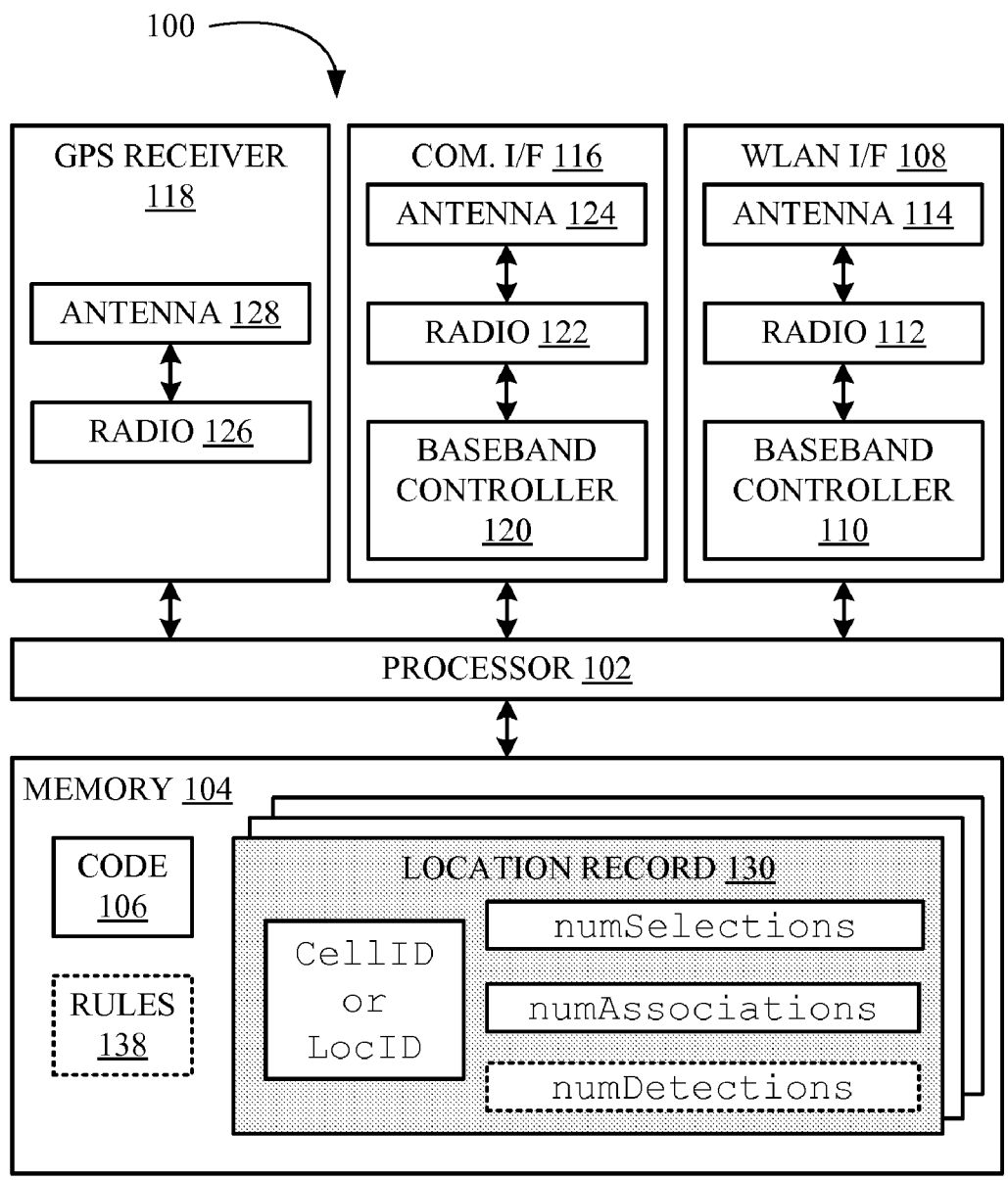
FIG. 1 is a block diagram of an exemplary mobile device.

FIG. 1 is a block diagram of an exemplary mobile device 100. A non-exhaustive list of examples for mobile device 100 includes a wireless-enabled laptop, a wireless-enabled cellphone, a wireless-enabled personal digital assistant (PDA), a wireless-enabled smart phone, a wireless-enabled video camera, a wireless-enabled gaming console, a wireless Internet Protocol (IP) phone and any other suitable mobile device.

Mobile device 100 comprises a processor 102 and a memory 104 coupled to processor 102. Memory 104 stores code 106 that, when executed by processor 102, may implement the methods described herein.

Mobile device 100 comprises a WLAN interface 108, compatible with one or more standards of the family of IEEE 802.11 wireless communication standards or with one or more ETSI HiperLAN standards. WLAN interface 108 is coupled to processor 102 and includes at least a baseband controller 110, a radio 112, and an antenna 114.

Mobile device 100 comprises a wireless communication interface 116 and/or a Global Positioning System (GPS) receiver 118, coupled to processor 102. Wireless communication interface 116 is compatible with one or more wireless cellular communication standards. Cellular interface 116 comprises at least a baseband controller 120 and a radio 122. Cellular interface 116 may comprise an antenna 124 or may share antenna 114. GPS receiver 118 may be able to receive signals that originate from GPS satellites and comprises at least a radio 126 and an antenna 128. Mobile device 100 may comprise other components that, for clarity, are not shown in FIG. 1.

Figure 2:
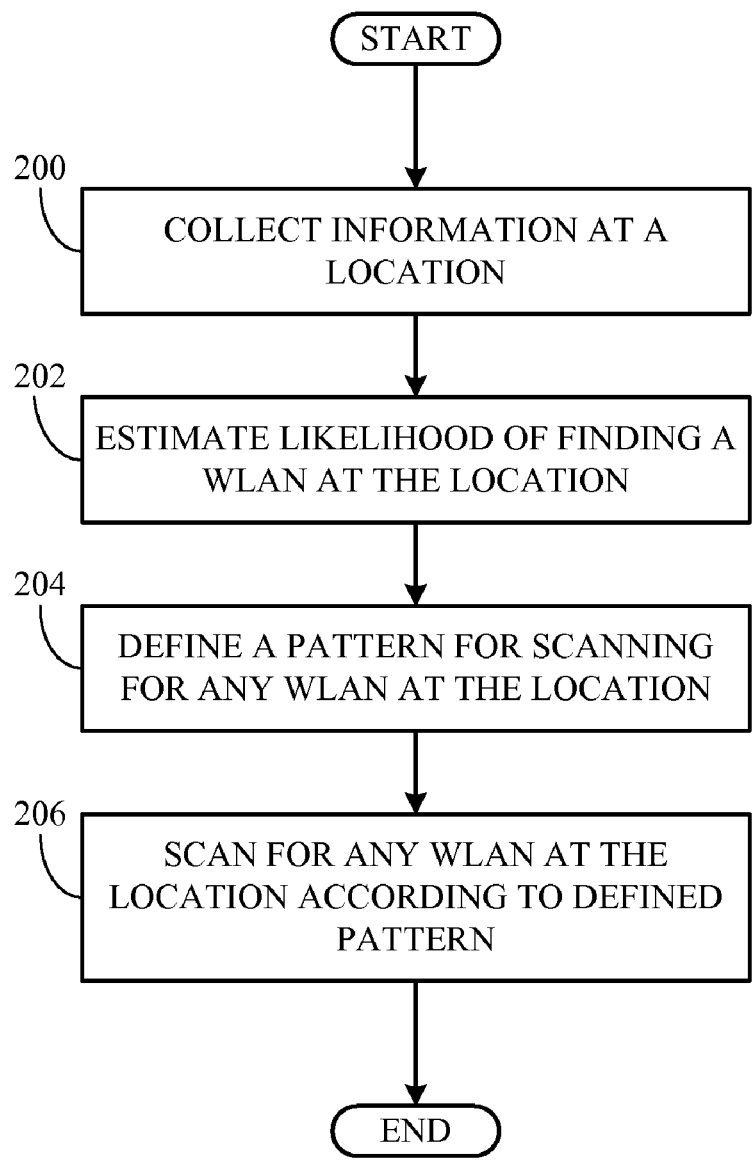
FIG. 2 is a flowchart of an exemplary method in a mobile device for location driven power saving.

FIG. 2 is a flowchart of an exemplary method in mobile device 100 for location driven power saving. For the purpose of the method of FIG. 2, a "location" may be defined in any desired and appropriate way. In one example given hereinbelow, a location is a "cellular location". In another example given hereinbelow, a location is a geographical location.

At 200, mobile device 100 collects information related to a particular location via WLAN interface 108 and any of cellular interface 116 and/or GPS receiver 118. Exemplary methods of collecting information are described hereinbelow with respect to FIGS. 4 and 7.

At 202, mobile device 100 estimates the likelihood of finding any and/or any particular wireless local area network at the particular location or in the vicinity thereof from information collected at 200. Examples for estimating the likelihood are described hereinbelow.

At 204, mobile device 100 defines one or more patterns for scanning for wireless local area networks at the particular location or in the vicinity thereof according to the likelihood estimated at 202. At 206, mobile device 100 scans for WLAN at the particular location or in the vicinity thereof using the one or more patterns defined or selected at 204. Defining the patterns may comprise selecting the patterns from a predefined set of patterns.

Figure 3:
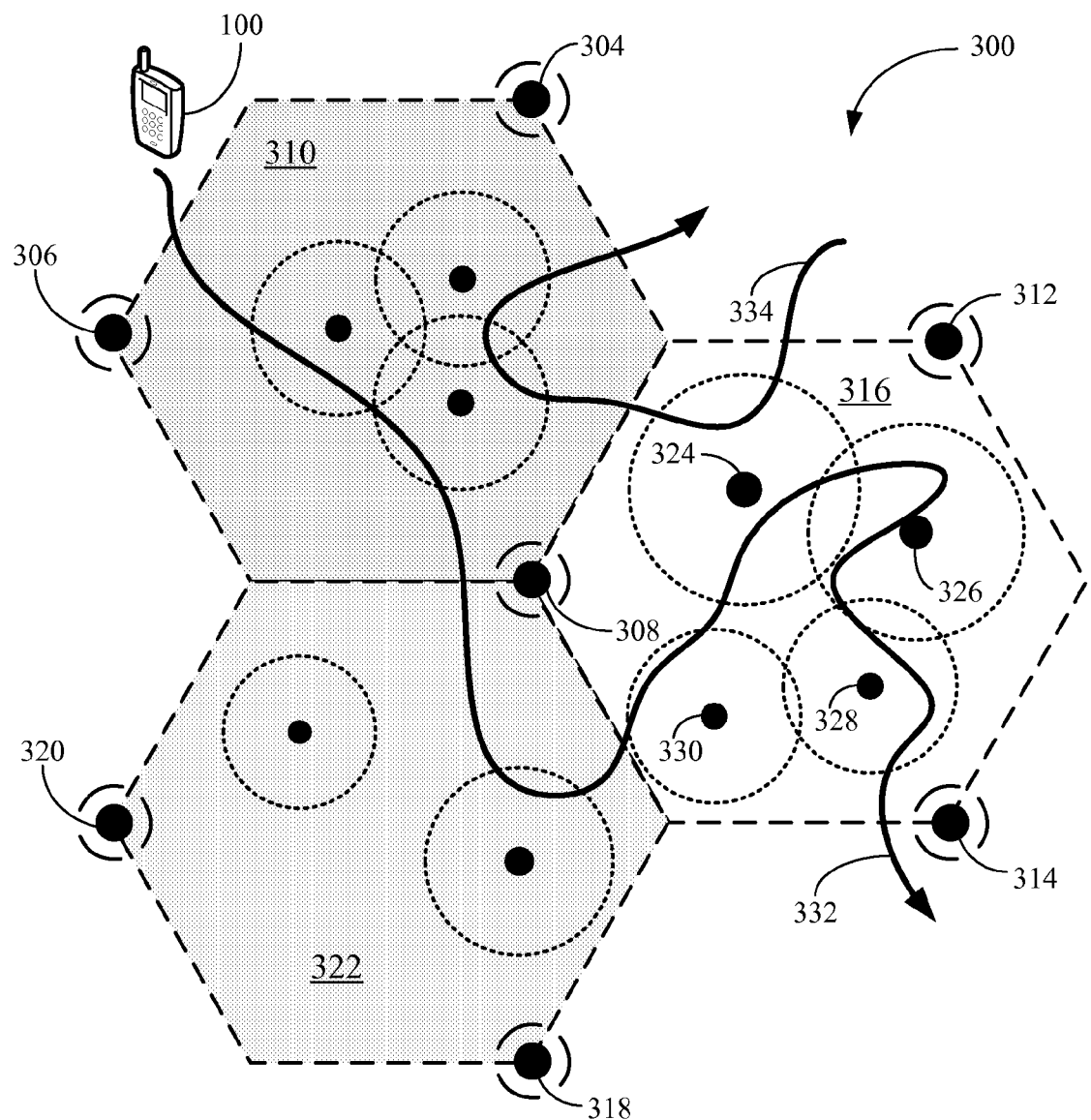
FIG. 3 is an illustration of an exemplary communications environment involving cellular base stations and WLAN access points.

FIG. 3 is an illustration of an exemplary communications environment 300 in which mobile device 100 is found. Environment 300 comprises cellular base stations and WLAN access points (AP). Base stations 304, 306 and 308 create a cell 310, base stations 312, 314 and 308 create a cell 316, and base stations 318, 320 and 308 create a cell 322. Although presented in FIG. 3 as hexagons, cells may have any physical shape. While located in any of cells 310, 316 and 322, mobile device 100 is able to communicate with one or more of the base stations. The base stations transmit identification signals that may identify the cells. An area in which mobile device 100 is able to identify a particular cell is referred to hereinbelow as a "cellular location".

Directed cells are known in the art of cellular communications. An area in which mobile device 100 is able to identify a particular directed cell is referred to hereinbelow as a "cellular location" and any references hereinbelow to cell IDs are equally applicable to directed cell IDs.

APs 324, 326, 328 and 330 are located in cell 316. Similarly, APs are located in cells 310 and 322. Although coverage areas of the APs are presented in FIG. 3 as circles, coverage areas may have any physical shape. Mobile device 100 may detect an AP while located in its coverage area and may associate itself with a detected AP.

A user of mobile device 100 may carry mobile device 100 to different places at different times, for example, as illustrated in FIG. 3 by a trajectory 332. The likelihood of mobile device 100 finding any wireless local area network or a particular wireless local area network may differ from place to place.

Mobile device 100 may maintain location records 130 for different cells, each location record 130 comprising information regarding the activity of mobile device 100 while located in the cell. An exemplary implementation of location records will now be described. Mobile device 100 may maintain a list of cells it roams to. Each item in the list is a record as follows:

```
LocationInfo RECORD {
CellID
numSelections
numAssociations
}
``` where CellID is the code identifying the cell the device just roamed to, numSelections is the number of times that mobile device 100 has roamed to the cell identified by CellID, and numAssociations is the number of times that mobile device 100 associated with any WLAN while connected to the cell identified by CellID.

Figure 4:
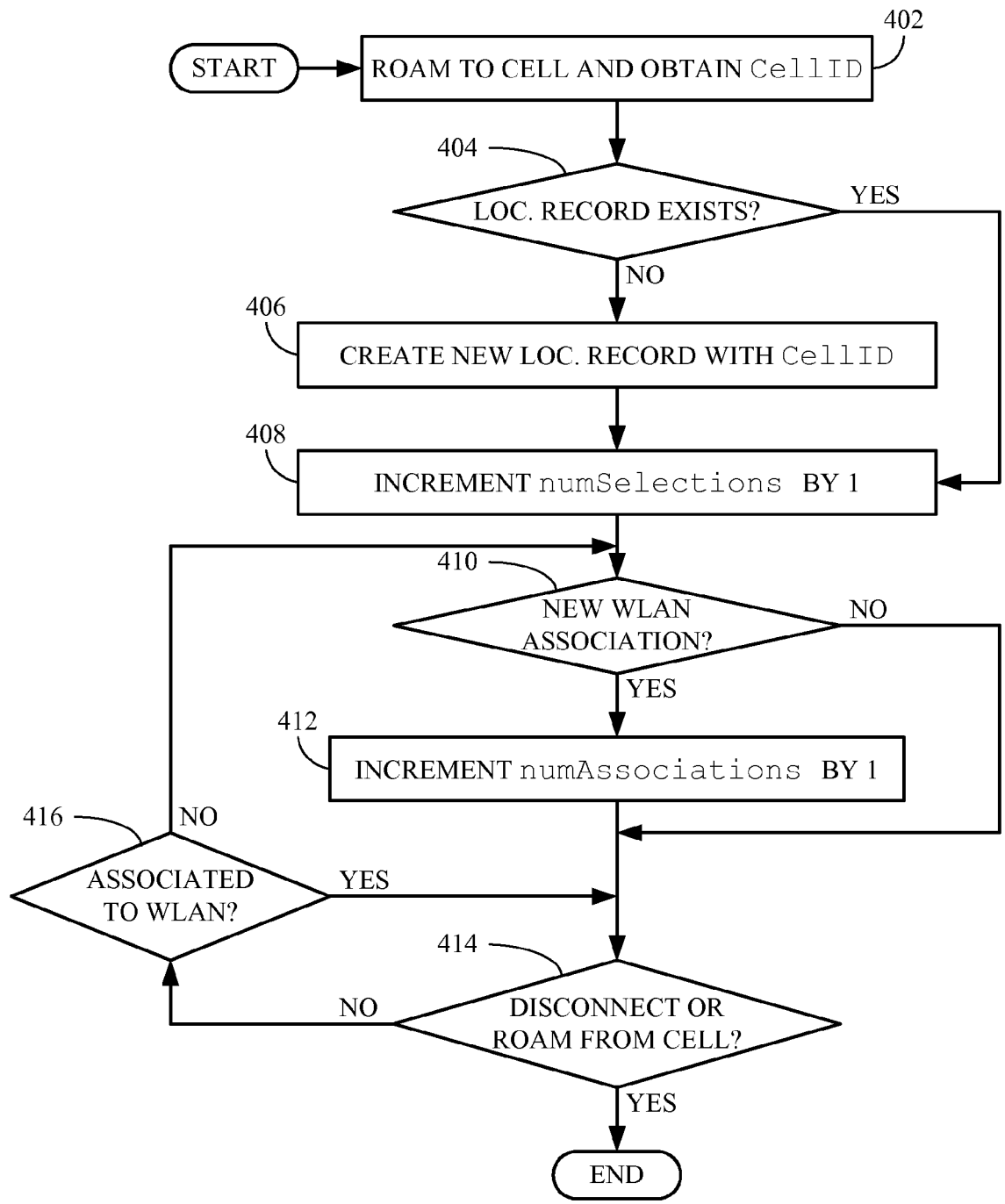
FIG. 4 is a flowchart of an exemplary method in a mobile device to collect information related to WLANs at a cellular location.

FIG. 4 is a flowchart of an exemplary method in mobile device 100 to collect information related to WLANs at a cellular location. At 402, mobile device 100 roams to a particular cell and obtains the CellID of the particular cell. For example, mobile device 100 may have roamed into cell 316, and CellID, identifying cell 316, may be obtained from signals transmitted by base station 308, 312 or 314. If mobile device 100 does not already have a location record for this CellID, as checked at 404, then a new location record for this CellID is created at 406, with the numSelections and numAssociations fields zeroed.

At 408, the numSelections field of the location record that either previously existed or was created at 406, is incremented by one to record that mobile device 100 has roamed to this cell.

If mobile device 100 has associated with a WLAN while located in the cell, as checked at 410, then the numAssociations field is incremented by one.

If mobile device 100 is no longer at the cellular location, either because it has disconnected from the cell or roamed to another cell, as checked at 414, the method terminates. Otherwise it is checked at 416 whether the mobile device 100 is associated to a WLAN. If so, the method proceeds to 414 and otherwise, to 410.

Consider, for example, trajectory 332 in FIG. 3. As mobile device 100 is carried along trajectory 332, mobile device 100 may record, using the method of FIG. 4, one selection of cell 310, in which there were two WLAN associations; one selection of cell 322, in which there was one WLAN association; and one selection of cell 316, in which there were four WLAN associations.

Another trajectory 334 is shown in FIG. 3. If on another occasion mobile device 100 is carried along trajectory 334, mobile device 100 may record, using the method of FIG. 4, another selection of cell 310, in which there were two WLAN associations; and another selection of cell 316, in which there was one WLAN association. After being carried along trajectories 332 and 334, the location record for cell 310 will have two in its numSelections field and four in its numAssociations field; the location record for cell 316 will have two in its numSelections field and five in its numAssociations field; and the location record for cell 322 will have one in its numSelections field and one in its numAssociations field.

Returning to the method of FIG. 2, mobile device 100 may use the information collected with the method of FIG. 4 to estimate at 202 the likelihood L of finding any wireless local area network at a particular location. The likelihood L may be estimated in any desired way. For example, the likelihood L may be calculated as a function of the values of the numSelections and numAssociations fields of the location record. One non-limiting example is given in Equation (1):

$$L = \frac{numAssociations + 1}{numSelections} \quad (1)$$

Equations 2, 3 and 4 show the likelihoods L for cells 310, 316 and 322, respectively, using the cumulative example of trajectories 332 and 334:

$$L(\text{Cell } 310) = \frac{5}{2} \quad (2)$$

$$L(\text{Cell } 316) = \frac{6}{2} \quad (3)$$

$$L(\text{Cell } 322) = \frac{1}{1} \quad (4)$$

The method of FIG. 4 may be modified to record not only associations with WLANs while located in the cell but also detections of WLANs while located in the cell (limited, for example, to one detection of a particular WLAN per instance of the mobile device having roamed to the cell). To accommodate this modification, mobile device 100 may maintain a list of cells it roams to, with each item in the list being a record as follows:

```
LocationInfo RECORD {
CellID
numSelections
numDetections
numAssociations
}
``` where numDetections is the number of times that mobile device 100 has detected any WLAN while connected to the cell identified by CellID (subject, to limitations such as described above). In this modification, the likelihood L of finding any wireless local area network at a particular location may be estimated as a function of the values of the numSelections, numDetections and numAssociations fields of the location record. One non-limiting example is given in Equation (5):

$$L = \frac{w_1(numDetections) + w_2(numAssociations) + 1}{numSelections} \quad (5)$$

where $w_1$ and $w_2$ are normalized weights. $w_2$ may be larger than $w_1$, to give greater weight to WLANs with which mobile device 100 actually associated while located in the cell.

At 204 of the method of FIG. 2, mobile device 100 may use the likelihood values shown in equations 2, 3 and 4 to define patterns for scanning for WLAN in the respective locations. The patterns may be defined in any desired way. One non-limiting example is given in Equation 6:

$$D(Location) = \begin{cases} D_{MIN}, & \frac{D_0}{L} < D_{MIN} \\ \frac{D_0}{L}, & D_{MIN} \leq \frac{D_0}{L} \leq D_{MAX}(L) \\ D_{MAX}(L), & \frac{D_0}{L} > D_{MAX}(L) \end{cases} \quad (6)$$

where D is the time interval between successive scan sessions for WLANs at a location, and $D_0$ represents a series of default time intervals that define a pattern for scanning for WLAN. These intervals are generally known as backoff intervals. In equation 5, $D_{MAX}(L)$ represents a maximal limit and $D_{MIN}$ represents a minimal limit for D.

$D_{MAX}(L)$ may be equal to a constant $D_{MAX}$ value for all values of likelihood L. A non-limiting example of $D_{MAX}$ is 256 seconds. Alternatively, $D_{MAX}(L)$ may be derived from a constant $D_{MAX}$ value, for example using Equation 7:

$$D_{MAX}(L) = \frac{D_{MAX}}{L} \quad (7)$$

Figure 5:
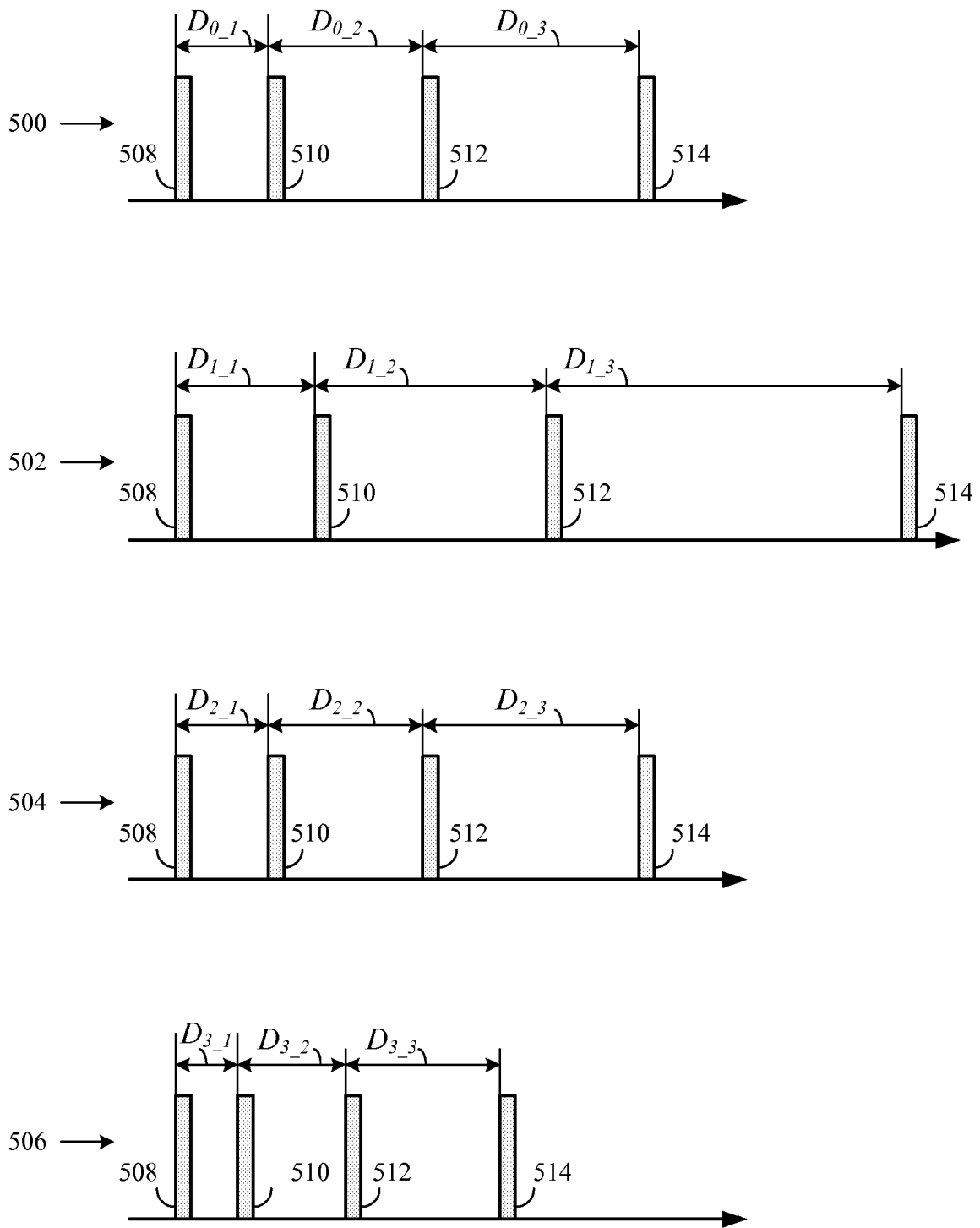
FIG. 5 shows exemplary patterns for scanning for WLANs.

FIG. 5 shows exemplary patterns 500, 502, 504 and 506 for scanning for WLANs. Scan pattern 500 comprises scan sessions 508, 510, 512 and 514 during which scanning for WLANs occurs. Default interval $D_{0\_1}$ separates scan sessions 508 and 510, default interval $D_{0\_2}$ separates scan sessions 510 and 512, and default interval $D_{0\_3}$ separates scan sessions 512 and 514.

Scan pattern 502 is an adjustment of scan pattern 500 according to equation 6 with a likelihood L of 2/3. Scan pattern 502 comprises scan sessions 508, 510, 512 and 514. Intervals $D_{0\_1}$, $D_{0\_2}$ and $D_{0\_3}$ of pattern 500 are replaced with longer intervals $D_{1\_1}$, $D_{1\_2}$ and $D_{1\_3}$, respectively, in pattern 502.

Scan pattern 504 is an adjustment of scan pattern 500 according to equation 6 with a likelihood L of 1. Scan pattern 504 comprises scan sessions 508, 510, 512 and 514. Intervals $D_{0\_1}$, $D_{0\_2}$ and $D_{0\_3}$ of pattern 500 are replaced with equivalent intervals $D_{2\_1}$, $D_{2\_2}$ and $D_{2\_3}$, respectively, in pattern 504.

Scan pattern 506 is an adjustment of scan pattern 500 according to equation 6 with a likelihood L of 5/3. Scan pattern 506 comprises scan sessions 508, 510, 512 and 514. Intervals $D_{0\_1}$, $D_{0\_2}$ and $D_{0\_3}$ of pattern 500 are replaced with shorter intervals $D_{3\_1}$, $D_{3\_2}$ and $D_{3\_3}$, respectively, in pattern 506.

Figure 6:
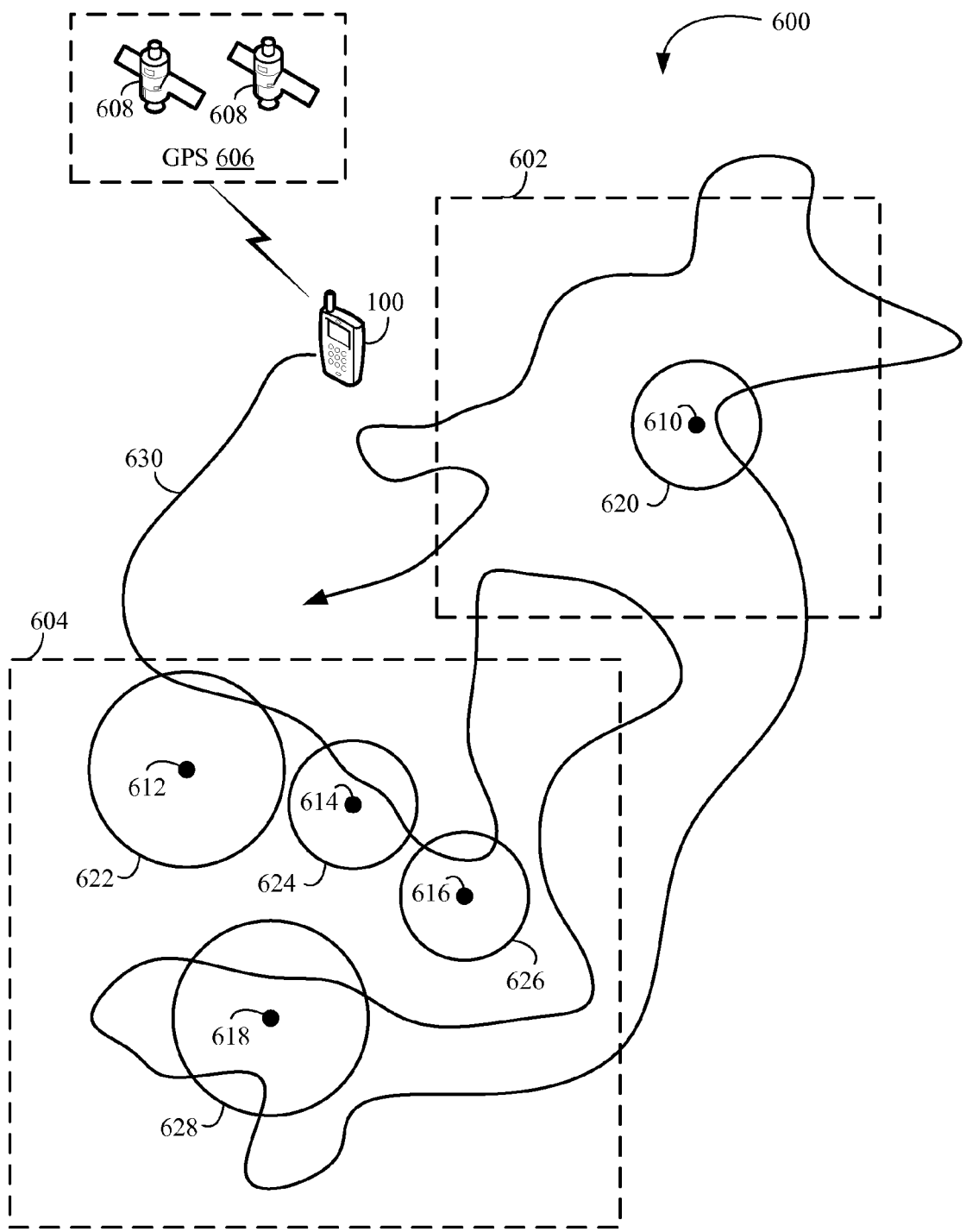
FIG. 6 is an illustration of an exemplary communications environment involving WLAN access points at different geographical locations.

FIG. 6 is an illustration of an exemplary communications environment 600 in which mobile device 100 is found. Environment 600 comprises WLAN access points at different geographical locations 602 and 604 which, for simplicity, are shown to have square shapes. Geographical locations may be defined by any one of many different ways and may have different sizes and shapes. For example, a geographical location may be defined by a single longitude/latitude point and a radius around that point. In another example, a geographical location may be defined by two longitude/latitude points that define a rectangular area.

Environment 600 also comprises GPS satellite system 606 that includes satellites 608 of which only two are shown. Mobile device 100 comprises GPS receiver 118 and via GPS receiver is able to receive signals transmitted by satellites 608. Mobile device 100 may further be able to estimate its geographic longitude and latitude coordinates (to some degree of certainty) from signals received from satellites 608.

AP 610 is located in geographical location 602 and APs 612, 614, 616 and 618 are located in geographical location 604. Although coverage areas of the APs are presented in FIG. 6 as circles, coverage areas may have any physical shape. Mobile device 100 may detect an AP while located in its coverage area and may associate itself with a detected AP.

A user of mobile device may carry mobile device 100 to different places at different times, for example, as illustrated in FIG. 6 by a trajectory 630. The likelihood of mobile device 100 finding any wireless local area network or a particular wireless local area network may differ from place to place.

Mobile device 100 may maintain location records 130 for different geographical locations, each location record 130 comprising information regarding the activity of mobile device 100 while located in the geographical location. An exemplary implementation of location records will now be described. Mobile device 100 may maintain a list of geographical locations it enters. Each item in the list is a record as follows:

```
LocationInfo RECORD {
LocID
numSelections
numAssociations
}
``` where LocID is an identification of the geographical location or a reference or partial information which mobile device 100 can further interpret, numSelections is the number of times that mobile device 100 has entered the geographical location identified by LocID, and numAssociations is the number of times that mobile device 100 associated with any WLAN while located in the geographical location identified by LocID.

Figure 7:
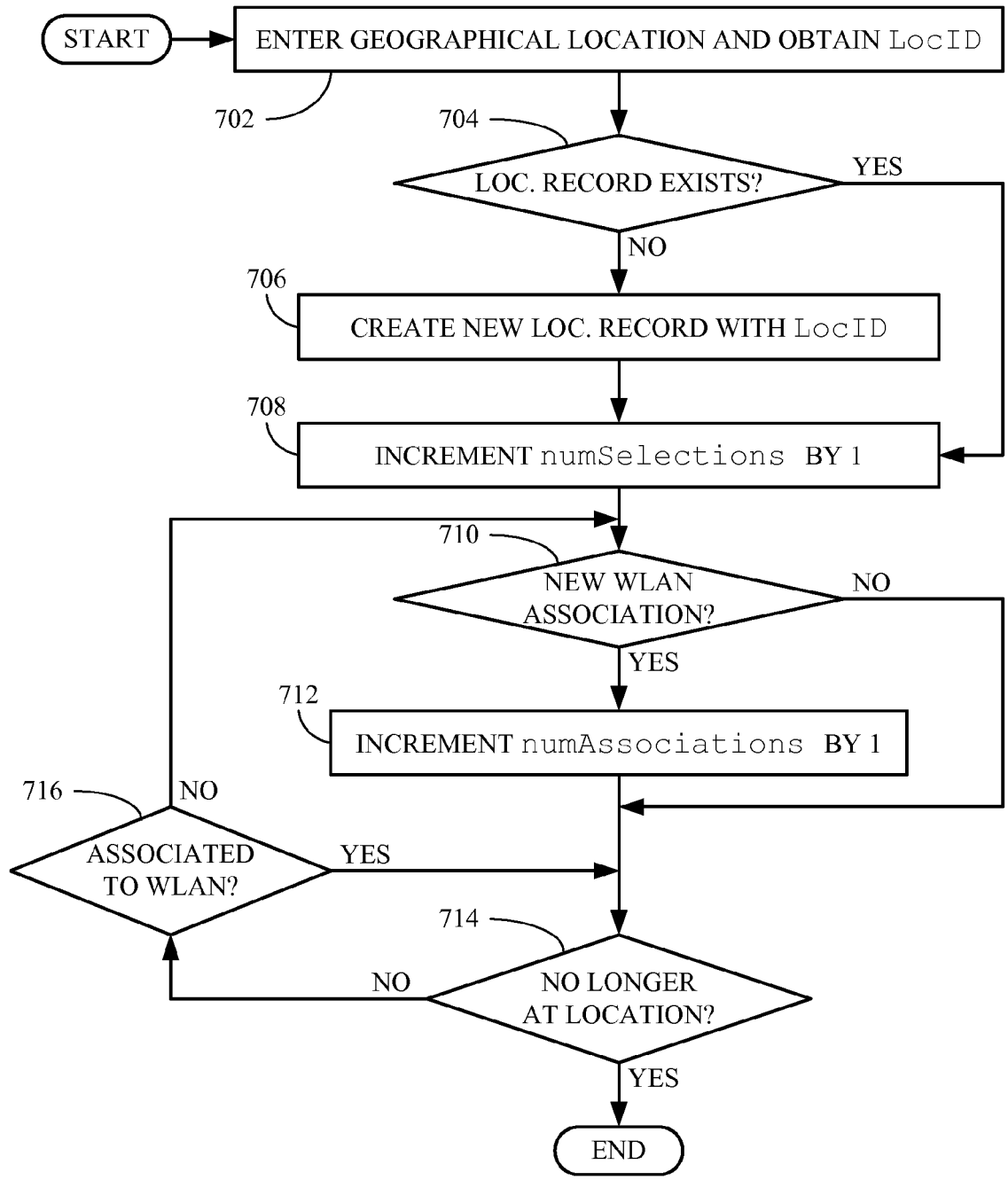
FIG. 7 is a flowchart of an exemplary method in a mobile device to collect information related to WLANs at a geographical location.

FIG. 7 is a flowchart of an exemplary method in mobile device 100 to collect information related to WLANs at a geographical location. At 702, mobile device 100 enters a particular geographical location and identifies the geographical location, for example, by comparing its own longitude and latitude coordinates to information stored in the LocID field of various existing location records.

If mobile device 100 does not already have a location record for this LocID, as checked at 704, then a new location record for this LocID is created at 706, with the numSelections and numAssociations fields zeroed. Mobile device 100 may store in memory 104 rules 138 how to define new geographical locations.

At 708, the numSelections field of the location record that either previously existed or was created at 706, is incremented by one to record that mobile device 100 has entered this geographical location.

If mobile device 100 has associated with a WLAN while located in the cell, as checked at 710, then the numAssociations field is incremented by one.

If mobile device 100 is no longer at the geographical location, for example, because its current longitude and latitude coordinates are no longer within the geographical location, as checked at 714, the method terminates. Otherwise it is checked at 716 whether the mobile device 100 is associated to a WLAN. If so, the method proceeds to 714 and otherwise, to 710.

Consider, for example, trajectory 630 in FIG. 6. As mobile device 100 is carried along trajectory 630, mobile device 100 may record, using the method of FIG. 6, two entries into geographical location 604, where there were five WLAN associations, and four entries into geographical location 602, where there was one WLAN association.

Returning to the method of FIG. 2, mobile device 100 may use the information collected with the method of FIG. 7 to estimate at 202 the likelihood L of finding any wireless local area network at a particular location. The likelihood L may be estimated in any desired way. One non-limiting example in given above in Equation 1.

Equations 8 and 9 shows the likelihoods L for the locations 602 and 604, respectively, using the example of trajectory 630:

$$L(\text{Location } 602) = \frac{2}{4} \quad (8)$$

$$L(\text{Location } 604) = \frac{6}{2} \quad (9)$$

The method of FIG. 7 may be modified to record not only associations with WLANs while located in the geographical location but also detections of WLANs while located in the geographical location (limited, for example, to one detection of a particular WLAN per instance of the mobile device having entered the geographical location). To accommodate this modification, mobile device 100 may maintain a list of geographical locations it enters, with each item in the list being a record as follows:

---
LocationInfo RECORD {
LocID
numSelections
numDetections
numAssociations
}

--- where numDetections is the number of times that mobile device 100 has detected any WLAN while located in the geographical location identified by LocID (subject, to limitations such as described above). In this modification, the likelihood L of finding any wireless local area network at a particular location may be estimated as a function of the values of the numSelections, numDetections and numAssociations fields of the location record. One non-limiting example of such a function is given in Equation (5) above.

At 204 of the method of FIG. 2, mobile device 100 may use the likelihood values shown in equations 8 and 9 to define patterns for scanning for WLAN in the respective locations. The patterns may be defined in any desired way. One non-limiting example is given in Equation 6 above.

Figure 8:
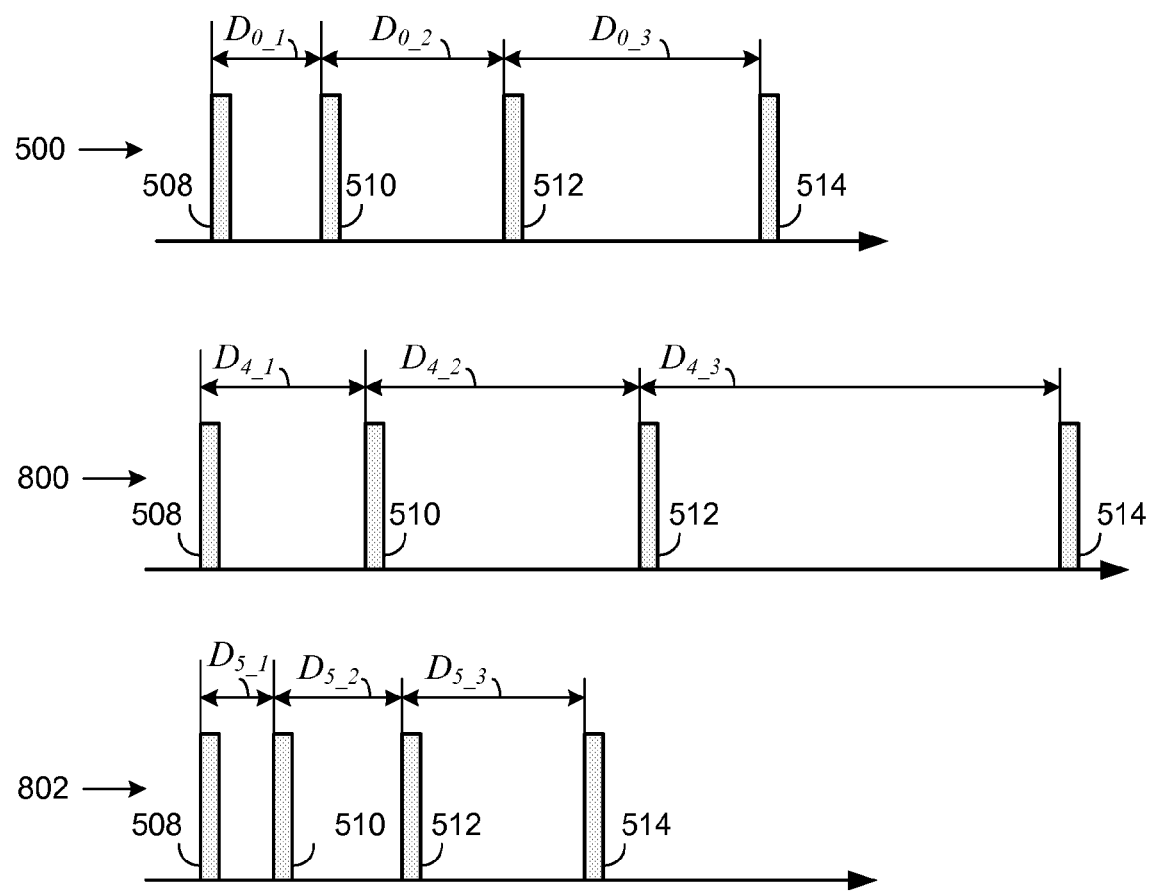
FIG. 8 shows exemplary patterns for scanning for WLANs.

FIG. 8 shows exemplary scan patterns 500, 800 and 802. Scan pattern 800 is an adjustment of scan pattern 500 for geographical location 602 according to equation 6 with a likelihood L of 2/4. Scan pattern 800 comprises scan sessions 508, 510, 512 and 514. Intervals $D_{0\_1}$, $D_{0\_2}$ and $D_{0\_3}$ of pattern 500 are replaced with longer intervals $D_{4\_1}$, $D_{4\_2}$ and $D_{4\_3}$, respectively, in pattern 800.

Scan pattern 804 is an adjustment of scan pattern 500 according to equation 6 with a likelihood L of 6/2. Scan pattern 804 comprises scan sessions 508, 510, 512 and 514. Intervals $D_{0\_1}$, $D_{0\_2}$ and $D_{0\_3}$ of pattern 500 are replaced with shorter intervals $D_{5\_1}$, $D_{5\_2}$ and $D_{5\_3}$, respectively, in pattern 804.

The preceding description describes the collection and use of the numAssociations and/or numDetections parameters on a per-cell or per-geographical location basis, where the values of those parameters may count different WLANs with which mobile device 100 associated or which mobile device 100 detected while located in the cell or geographical location.

Figure 9:
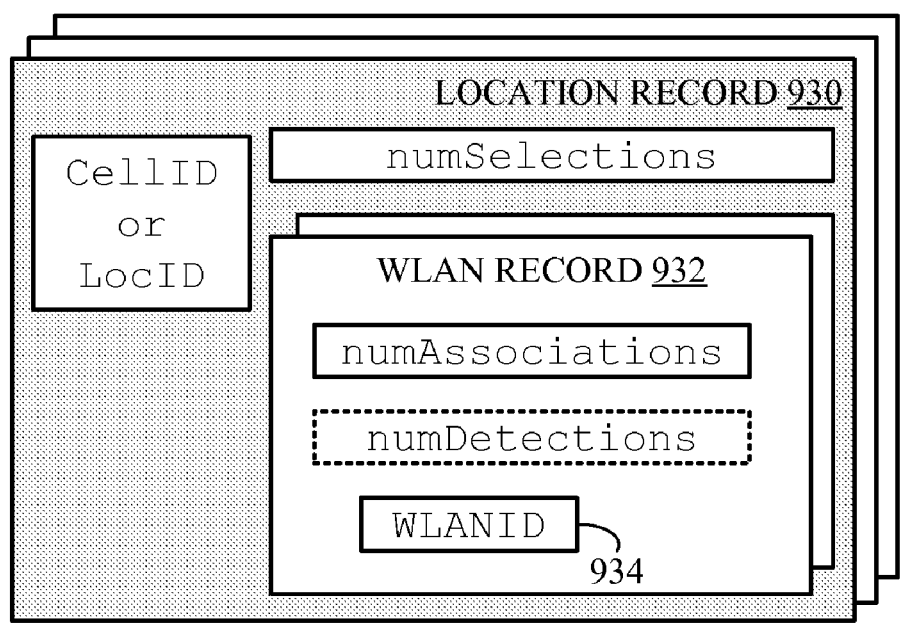
FIG. 9 is an illustration of a modified location record in which one or more WLAN records are stored.

The methods and records described hereinabove may be modified to collect and use the numAssociations and/or numDetections parameters on a per-WLAN basis within each cell or geographical location. FIG. 9 is an illustration of a modified location record 930 in which one or more WLAN records 932 are stored. A WLAN record 932 identifies the WLAN for which the record is being kept with a WLANID field 934. The value of the WLANID field 934 may be any identifier that uniquely identifies the WLAN within the cell or geographical location. For example, the value may be the service set identifier (SSID) of the WLAN. Each WLAN record 932 has its own numAssociations and/or numDetections fields.

An exemplary implementation of such location records will now be described. Mobile device 100 may maintain a list of cells it roams to. Each item in the list is a record as follows:

---
LocationInfo RECORD {
CellID
numSelections
WLANInfo[MAX_WLANS]
}

--- and the record WLANInfo is as follows:

---
WLANInfo RECORD {
WLANID
NumAssociations
}

---

Likewise, mobile device 100 may maintain a list of geographical locations it enters. Each item in the list is a record as follows:

```
LocationInfo RECORD {
LocID
numSelections
WLANInfo[MAX_WLANS]
}
``` where the record WLANInfo is as described above.

Figure 10:
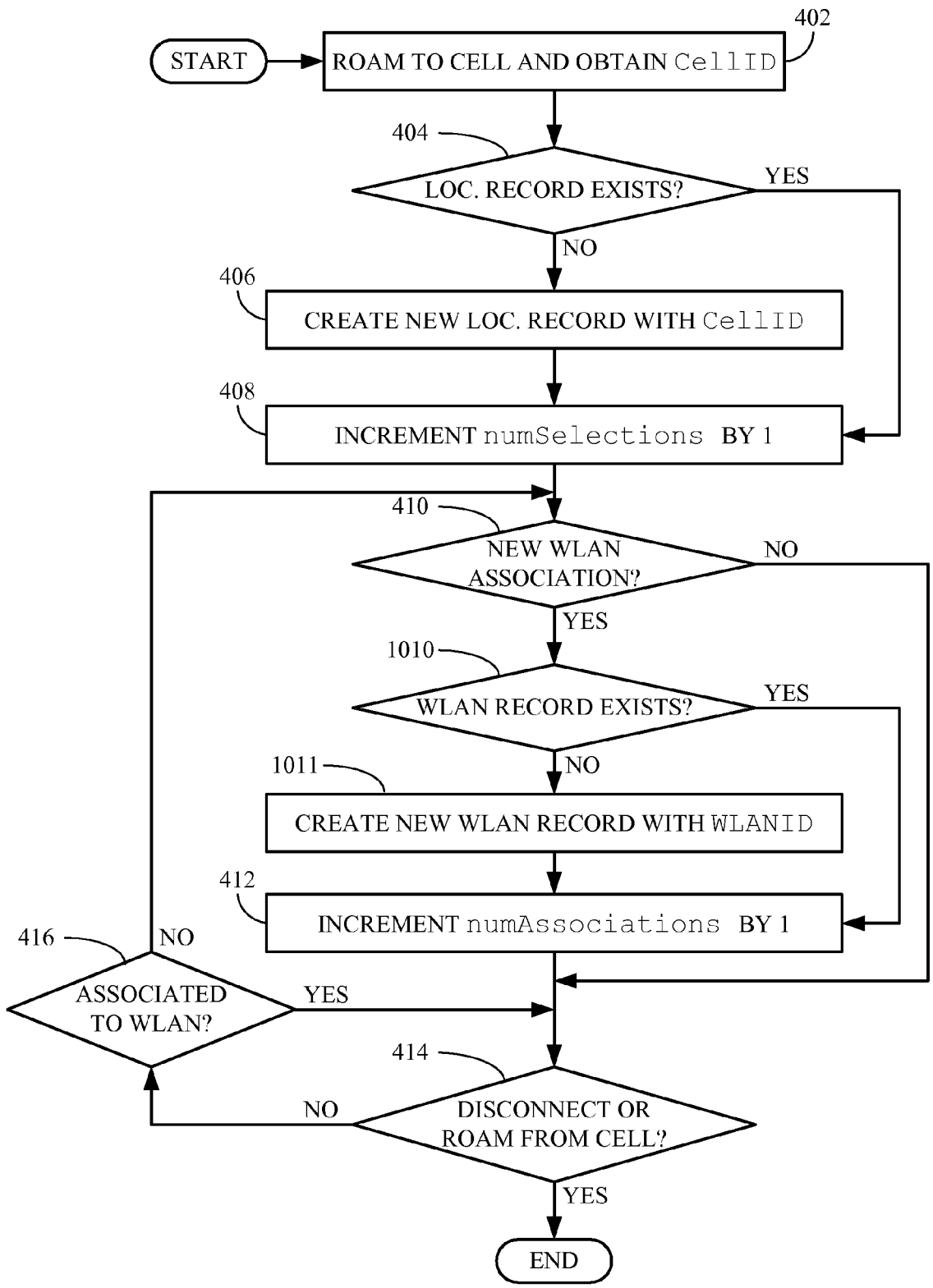
FIGS. 10 and 11 are flowcharts of exemplary alternative methods for collecting information related to WLAN activity at a location.
Figure 11:
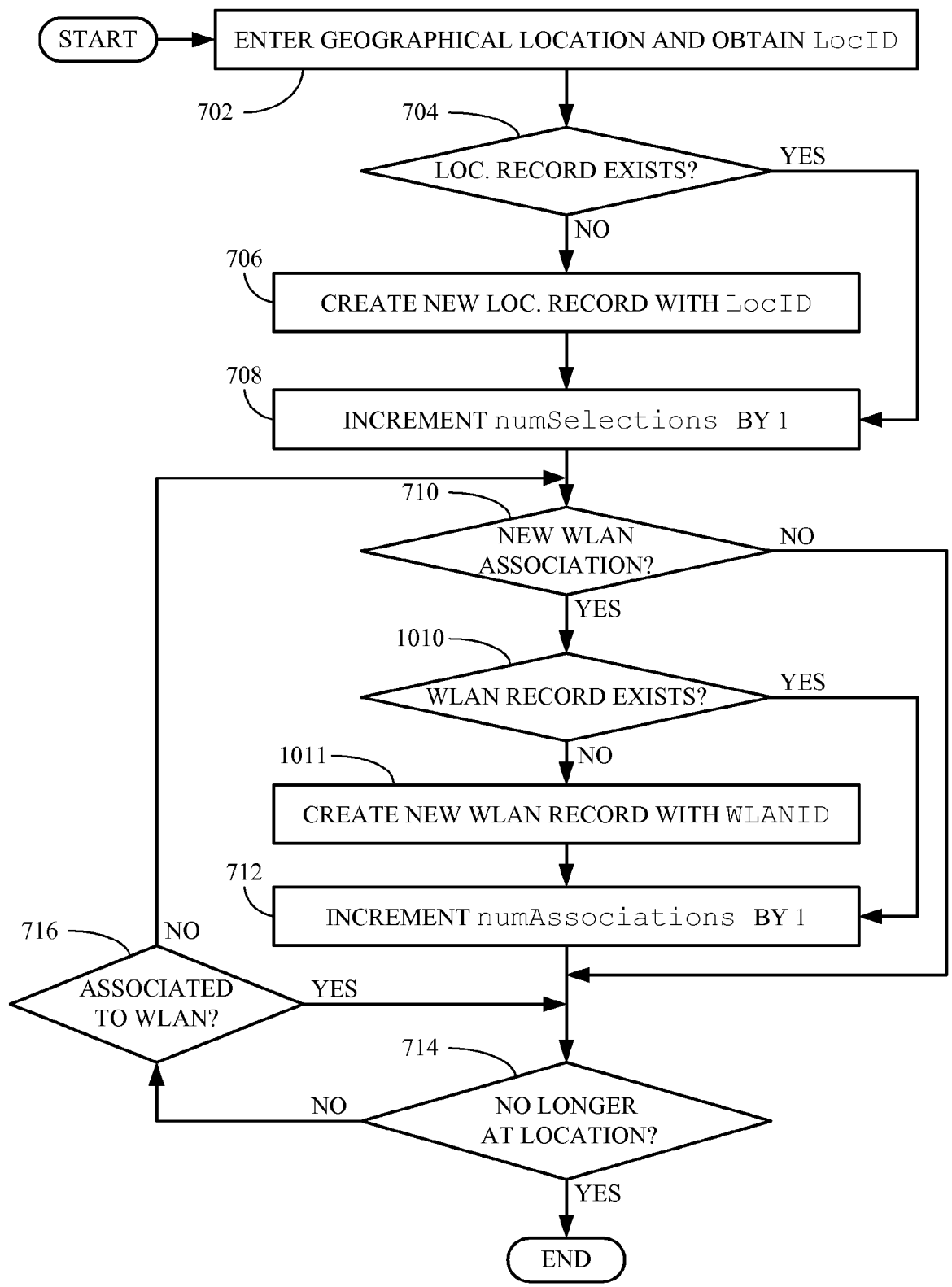

FIGS. 10 and 11 are flowcharts of exemplary alternative methods for collecting WLAN information. The method of FIG. 10 differs from the method of FIG. 4 (and the method of FIG. 11 differs from the method of FIG. 7) in that after a new WLAN association is identified at 410 (710), it is checked at 1010 whether a WLAN record for the newly associated WLAN exists within the location record. If not, then a new WLAN record with a WLANID that identifies the WLAN and with numAssociations zeroed is created at 1011. Then the method proceeds to 412 (712). The number of WLAN records kept per cell or geographical location may be unlimited, or may be limited, for example, to no more than three.

The method of FIG. 2 may then be modified to estimate the likelihood of finding a particular WLAN at the location, defining a pattern for scanning for the particular WLAN at the location, and scanning for the particular WLAN at the location according to the defined pattern. For example, the values of numAssociations and/or numDetections used to calculate the estimated likelihood L are the values stored in the WLAN record 932 of the location record 930.

Computer-executable instructions for managing communications such as in the above-described methods may be stored on a form of computer readable media. Computer readable media includes volatile and nonvolatile, removable and non-removable media implemented in any method or technology for storage of information such as computer readable instructions, data structures, program modules or other data. Computer readable media includes, but is not limited to, random access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium which can be used to store the desired instructions and which can be accessed by Internet or other computer network forms of access.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method in a mobile device having a wireless local area network interface and one or more other wireless interfaces, the method comprising:
    identifying a location of said mobile device via one or more of said other wireless interfaces;
    calculating a value that depends, at least in part, on a number numSelections that represents how many times said mobile device entered said location and on a number numAssociations that represents how many times said mobile device associated with any wireless local area network or a particular wireless local area network while at said location;
    determining intervals from said value, wherein as the ratio of numAssociations to numSelections increases said intervals are shorter subject to a lower limit for said intervals and wherein as the ratio decreases said intervals are longer subject to an upper limit for said intervals; and
    scanning for wireless local area networks while at said location during scan sessions that are separated by said intervals,
    wherein said number numSelections is at least 1.

2. The method of claim 1, wherein one of said one or more other wireless interfaces is a cellular interface, and said location is a cellular location.

3. The method of claim 1, wherein one of said one or more other wireless interfaces is a Global Positioning System receiver, and said location is a geographical location.

4. The method of claim 1, wherein said value further depends, at least in part, on how many times said mobile device detected any wireless local area network while at said location.

5. The method of claim 1, further comprising:
    collecting information about wireless local area network activity of said mobile device while at said location.

6. The method of claim 1, wherein said value further depends, at least in part, on how many times said mobile device detected said particular wireless local area network while at said location.

7. A mobile device comprising:
    a processor;
    a wireless local area network interface coupled to said processor, through which said mobile device is able to scan for wireless local area networks;
    one or more other wireless communication interfaces coupled to said processor, through which said mobile device is able to identify a location of said mobile device; and
    a memory to store code which, when executed by said processor, is arranged to calculate a value that depends, at least in part, on a number numSelections that represents how many times said mobile device entered said location and on a number numAssociations that represents how many times said mobile device associated with any wireless local area network or a particular wireless local area network while at said location, to determine intervals from said value, wherein as the ratio of numAssociations to numSelections increases said intervals are shorter subject to a lower limit for said intervals and wherein as the ratio decreases said intervals are longer subject to an upper limit for said intervals, and to control said wireless local area network interface to scan for wireless local area networks or said particular wireless local area network while at said location during scan sessions that are separated by said intervals, wherein said number numSelections is at least 1.

8. The mobile device of claim 7, wherein said code, when executed by said processor, is further arranged to collect information about wireless local area network activity of said mobile device while at said location.

9. The mobile device of claim 7, wherein one of said one or more other wireless interfaces is a cellular interface, and said location is a cellular location.

10. The mobile device of claim 7, wherein one of said one or more other wireless interfaces is a Global Positioning System receiver, and said location is a geographical location.

11. The mobile device of claim 7, wherein said value further depends, at least in part, on how many times said mobile device detected any wireless local area network while at said location.

12. The mobile device of claim 7, wherein said value further depends, at least in part, on how many times said mobile device detected said particular wireless local area network while at said location.

13. A non-transitory computer-readable medium having computer-executable instructions which when executed by a mobile device having a wireless local area network interface and one or more other wireless communication interfaces, result in said mobile device:

identifying a location of said mobile device via one or more of said other wireless interfaces;

calculating a value that depends, at least in part, on a number numSelections that represents how many times said mobile device entered said location and on a number numAssociations that represents how many times said mobile device associated with any wireless local area network or a particular wireless local area network while at said location;

determining intervals from said value, wherein as the ratio of numAssociations to numSelections increases said intervals are shorter subject to a lower limit for said intervals and wherein as the ratio decreases said intervals are longer subject to an upper limit for said intervals; and scanning for wireless local area networks or said particular wireless local area network while at said location during scan sessions that are separated by said intervals, wherein said number numSelections is at least 1.

14. The computer-readable medium of claim 13, wherein said value also depends, at least in part, on how many times said mobile device detected any wireless local area network while at said location.

15. The computer-readable medium of claim 13, wherein said value also depends, at least in part, on how many times said mobile device detected said particular wireless local area network while at said location.

* * * * *